United States Patent [19]
Goodwin et al.

[11] Patent Number: 5,708,804
[45] Date of Patent: Jan. 13, 1998

[54] APPARATUS AND METHOD THEREFOR OF INTELLIGENTLY SEARCHING FOR INFORMATION IN A PERSONAL COMMUNICATIONS DEVICE

[75] Inventors: Julie Francis Goodwin, Boca Raton; Charles Sterling Lanier, Delray Beach; James Robert Lewis, Coconut Creek; Byron Kevin Tiller, Boca Raton; Raymond Lee Yee, Coral Springs, all of Fla.

[73] Assignee: International Business Machines Corp., Armonk, N.Y.

[21] Appl. No.: 686,407

[22] Filed: Jul. 26, 1996

Related U.S. Application Data

[63] Continuation of Ser. No. 279,640, Jul. 25, 1994, abandoned.

[51] Int. Cl.$^6$ .............................. G06F 17/30; H04M 1/27
[52] U.S. Cl. ......................... 395/603; 395/605; 395/606; 379/96; 379/355; 379/368
[58] Field of Search ........................ 395/603, 605, 395/606; 379/355, 96, 368

[56] References Cited

U.S. PATENT DOCUMENTS

| | | | |
|---|---|---|---|
| 4,908,853 | 3/1990 | Matsumoto | 379/355 |
| 5,034,976 | 7/1991 | Sato | 379/113 |
| 5,216,705 | 6/1993 | Yoshida et al. | 379/100 |
| 5,226,148 | 7/1993 | Littlewood | 395/575 |
| 5,255,310 | 10/1993 | Kim et al. | 379/88 |
| 5,267,308 | 11/1993 | Jokinen et al. | 379/354 |
| 5,272,748 | 12/1993 | Davis | 379/63 |
| 5,289,533 | 2/1994 | Wasio et al. | 379/100 |
| 5,349,629 | 9/1994 | Kumano | 379/58 |
| 5,351,190 | 9/1994 | Kondo | 364/419.08 |
| 5,384,836 | 1/1995 | Otsuka | 379/100 |
| 5,418,951 | 5/1995 | Damashek | 395/60 |
| 5,568,546 | 10/1996 | Marutiak | 379/355 |

*Primary Examiner*—Thomas G. Black
*Assistant Examiner*—Jean R. Homere
*Attorney, Agent, or Firm*—George E. Grosser

[57] ABSTRACT

A data processing device and method for searching a database having a plurality of entries to locate entries which match a search string. Each entry within the database is arranged into one or more predetermined search fields which each contain a character string. In response to receipt of a search string, a determination is made whether the search string is a subset of a particular entry within the database. In response to the determination that the search string is a subset of a particular entry, the particular entry is recorded as a matching entry. However, in response to a determination that the search string is not a subset of a particular entry, a determination is made whether a modified search string formed by removing delimiters from the search string is a subset of a character string within a particular predetermined search field within the particular entry. In response to a determination that the modified search string is a subset of the character string, the particular entry is recorded as a matching entry. Thereafter, the foregoing steps are repeated for each of the number of entries within the database such that matching entries within the database are efficiently located.

22 Claims, 12 Drawing Sheets

APPARATUS AND METHOD THEREFOR OF INTELLIGENTLY SEARCHING FOR INFORMATION IN A PERSONAL COMMUNICATIONS DEVICE

The application is a continuation of application Ser. No. 08/279,640, filed Jul. 25, 1994, now abandoned.

FIELD OF THE INVENTION

The present invention relates to data processing systems and more particularly to a personal data processing communications system that has a touch screen interface that enables the user to search a database stored within the device.

RELATED PATENT APPLICATIONS

This patent application is related to co-pending U.S. patent application Ser. No. 08/279,638, filed Jul. 25, 1994, entitled "Field Programming Apparatus and Method for Updating Programs in a Personal Communications Device", now U.S. Pat. No. 5,590,373, assigned to the IBM Corporation and incorporated herein by reference.

This patent application is also related to co-pending U.S. patent application Ser. No. 08/145,914, filed Nov. 1, 1993, by David J. Allard, et al., entitled "Personal Communicator Having Collapsible Keyboard for Editing Information on Small Touch Screen Display", now abandoned, assigned to the IBM Corporation and incorporated herein by reference.

This patent application is also related to co-pending U.S. patent application Ser. No. 08/146,341, filed Nov. 1, 1993, by David J. Allard, et al., entitled "Personal Communicator Having Improved Zoom and Pan Functions for Editing Information on Touch Sensitive Display", now abandoned, assigned to the IBM Corporation and incorporated herein by reference.

This patent application is further related to co-pending U.S. patent application Ser. No. 08/146,342, filed Nov. 1, 1993, by David J. Allard, et al., entitled "Personal Communicator Having Improved Contrast Control for a Liquid Crystal, Touch Sensitive Display", now U.S. Pat. No. 5,422,656, assigned to the IBM Corporation and incorporated herein by reference.

This patent application is further related to co-pending U.S. patent application Ser. No. 08/279,639, filed Jul. 25, 1994, filed July, 1994, by David J. Allard, et al., entitled "Apparatus and Method for Marking Text on a Display Screen in a Personal Communications Device", now abandoned, assigned to the IBM Corporation and incorporated herein by reference.

This patent application is further related to co-pending U.S. patent application Ser. No. 08/279,644, filed Jul. 25, 1994, by David J. Allard, et al., entitled "Selective Reconfiguration Method and Apparatus in a Multiple ApplicatiOn Personal Communications Device", now U.S. Pat. No. 5,568,536, assigned to the IBM Corporation and incorporated herein by reference.

BACKGROUND OF THE INVENTION

Figure 1:
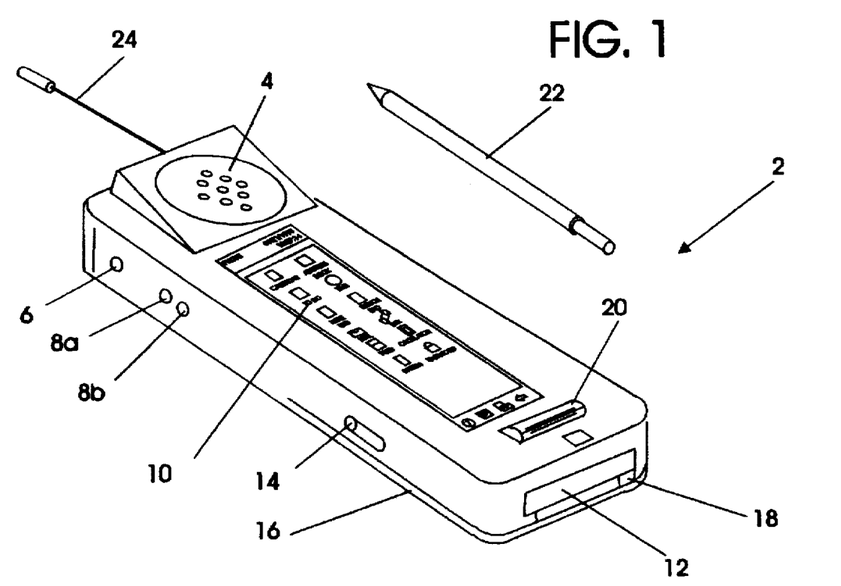
FIG. 1 is a perspective view of the personal communications device of the instant invention.
Figure 2:
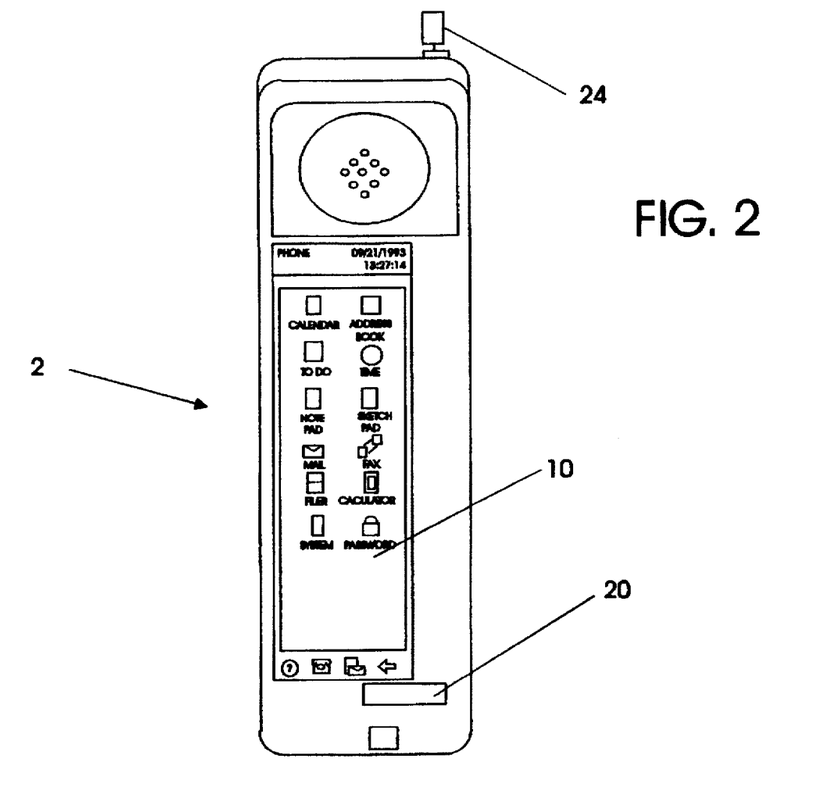
FIG. 2 is a plan view of the FIG. 1 device.

A personal communications device SIMON, announced by the IBM Corporation in 1994, includes many features for facilitating personal communications. As shown in FIGS. 1 and 2, the SIMON personal communications device 2 resembles, and is, a cellular telephone. It is further an electronic pager. In addition, it is capable of facsimile transmission and reception as well as electronic mail sending and receiving. Moreover, it further includes features among which include a computer note pad, address book and calendar.

As shown, device 2 has a speaker 4, an on and off switch 6, volume adjust switches 8a and 8b, a touch sensitive display screen 10, a PCMCIA card receptacle slot 12, a PCMCIA card release switch 14, a battery pack 16, an input/output connector 18 and a microphone 20. Also provided with the system is a stylus 22, which may be used to interact with touch sensitive screen 10. It should be noted, however, that in place of stylus 22, a user can use his finger. To act as a cellular device, an antenna 24 is extendable from the body of the device 2.

The device comes standard with a suite of software applications each invoked by touching the LCD screen interface. Among the software applications are the above mentioned address book, note pad and calendar each of which allows the user to enter information. In the case of the address book, the user would enter information such as for example, name, address, phone/fax numbers, company name, comments, personal information etc.

Oftentimes a user may want to search for someone, some telephone/fax number, some company name or other information, but yet can only remember a portion of what he wants. It is therefore advantageous to provide a search function in the device which simplifies and intelligently searches for an entry which corresponds to an abbreviated search string entered by the user.

BRIEF DESCRIPTION OF THE INVENTION

To enable a user to effectively search for information without having to remember exactly what the information is, the present invention device has incorporated therein a search function, in the case of searching information in the address book, represented by a search button displayed from any of the address book screens. The user can enter a particular search string which may comprise only a limited number of characters and be able to retrieve from the particular database, for example the address book file, an entry or entries which resemble the input search string.

The search methodology is based on first having the contents of each of the entries in the database arranged into predetermined search fields. In the case of the address book database, the search fields may include the name, the telephone/fax numbers, the company name, the address (both home and work), and other personal information relating to that person. Once a search request, which necessarily encompasses an input string, is entered, a comparison is made between the input string and the characters of each of the entries in one of the search fields. If a match is made between a particular entry and the input string, that entry is marked and displayed to the user at the end of the search. If no match is found for the different entries in the first search field, then the comparison proceeds to a second search field, and a third and so on until all comparisons have been made and/or matches have been marked. At the end of the search, if there is more than one matched entry, all matched entries are displayed to the user, who then can proceed to determine which entry he actually wants. The data entered as an input string by the user could be a part of a person's name, address, phone/fax number, electronic mail address, company name, and other personal information. In the case of the name search, the present invention methodology allows a user to enter either the first or the last name, or any part thereof for a search. Furthermore, the instant invention methodology is case-insensitive in that it matters not whether a character has been capitalized.

It is therefore an objective of the present invention to provide a user an efficient search method whereby he does not have to remember the exact information that he wants to search.

It is therefore yet another objective of the present invention to enable a user to input different parts of data that he remembers with respect to a person, company, telephone etc. and be able to retrieve an entry that provides him with all the entered data that relates to that entry.

It is yet another objective of the present invention to provide a search, in the case of a name search, which is not dependent on whether the first name or surname of a person to be searched is input, or whether some of the letters have been capitalized.

BRIEF DESCRIPTION OF THE DRAWINGS

Other objectives and advantages of the invention will be apparent from the following description taken in conjunction with the accompanying drawings wherein.

DETAILED DESCRIPTION OF THE INVENTION

Figure 3:
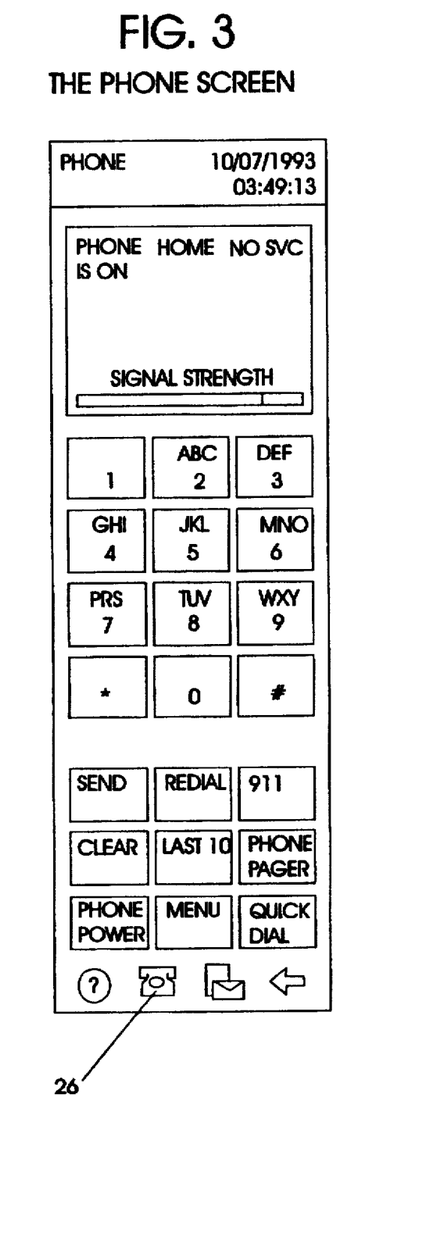
FIG. 3 is an enlarged view of one of the available screens being displayed by the FIG. 1 device.

With reference to FIG. 3, display 10 of the personal communications device of the instant invention can be selected to have a phone screen, by the user pressing the phone icon 26 at the bottom of the screen. With the display of the phone screen, device 2 can be used as a cellular telephone. A more detailed discussion of the touch overlay is given in the aforementioned co-pending applications.

Figure 4:
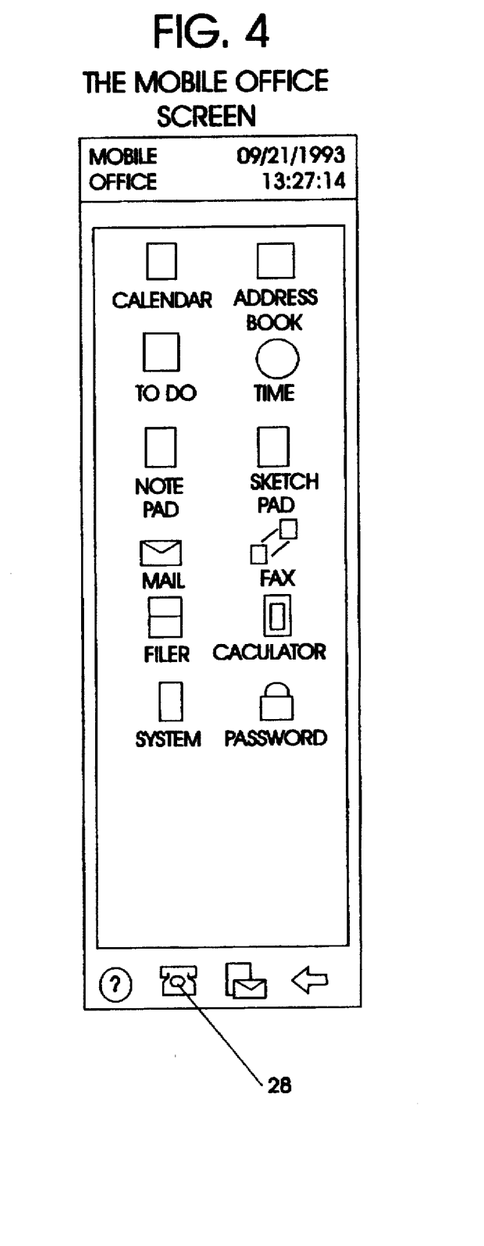
FIG. 4 is another exemplar display screen of the FIG. 1 device.

With reference to FIG. 4, when icon 28 is pressed at the bottom of the display, the mobile office screen is shown. As can be seen, there are a number of different applications which device 2 is capable of. For example, device 2 has its own calendar and note pad, as well as a filer and an address book. In addition, it is capable of E-mail operation via the icon entitled "Mail" and a facsimile mail operation via the icon entitled "Fax".

To enable device 2 to perform the variety of communications, different communication links besides the radio link for the cellular telephone are also integrated thereto. These different types of communication links are described in the above referenced co-pending application.

Figure 5:
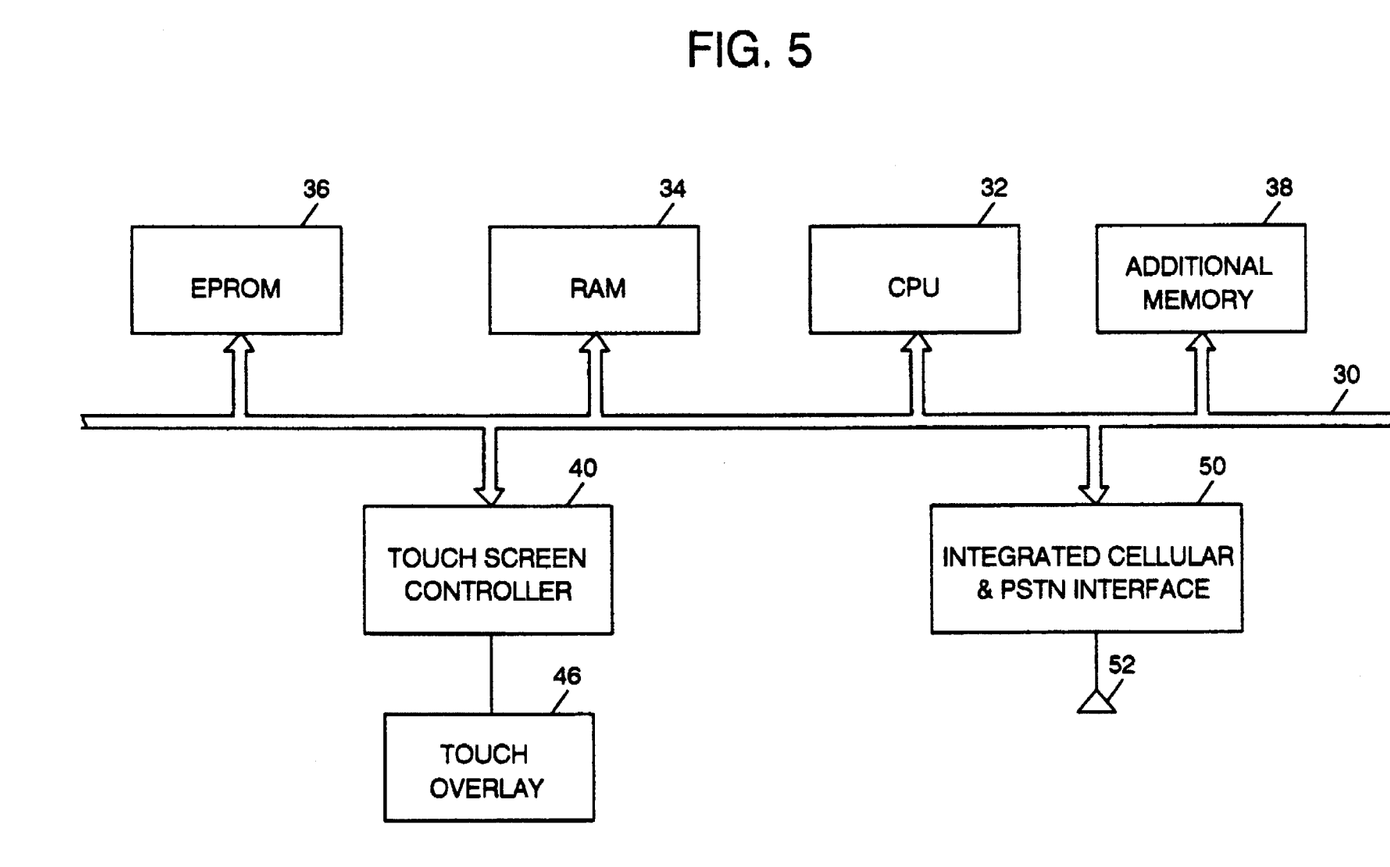
FIG. 5 is a simplified block diagram of the different components of the FIG. 2 device which are relevant to the instant invention.

FIG. 5 is a simplified block diagram of device 2 of the instant invention which only illustrates components relevant to the instant invention. The more detailed illustration of the different components of device 2 may be gleaned from the various referenced co-pending applications. As shown, connected to system bus 30 of the instant invention system is a processing unit 32. A number of different types of memories such as RAM 34, EPROM 36 and additional memory 38 are also connected to system bus 30. Memory 38 may be in the form of a PCMCIA (personal computer memory card international association) standard card inserted to receptacle slot 12 of device 2. See FIG. 1. Memory 38 may include extra RAM or ROM for storing additional data to be used in the system. RAM 34 is the working memory for CPU 32. EPROM 36 has stored therein a number of applications among which includes the address book illustrated as an icon in the mobile office screen of FIG. 4.

Also connected to system bus 30 and being controlled by CPU 32 is a touch screen controller 40 for controlling touch overlay 46 of the display screen of device 2. A more detailed discussion of the touch overlay can be had with reference to the aforementioned co-pending applications.

Also shown being connected to system bus 30 is an integrated cellular and PSTN interface 50 which comprises, among other things, a cellular link as exemplified by antenna 52, a conventional type of serial port, conventional telephone jacks and a modem for data/fax communication. A more detailed discussion of the various communications sub-systems of device 2 is given in aforenoted applications.

Figures 6, 7:
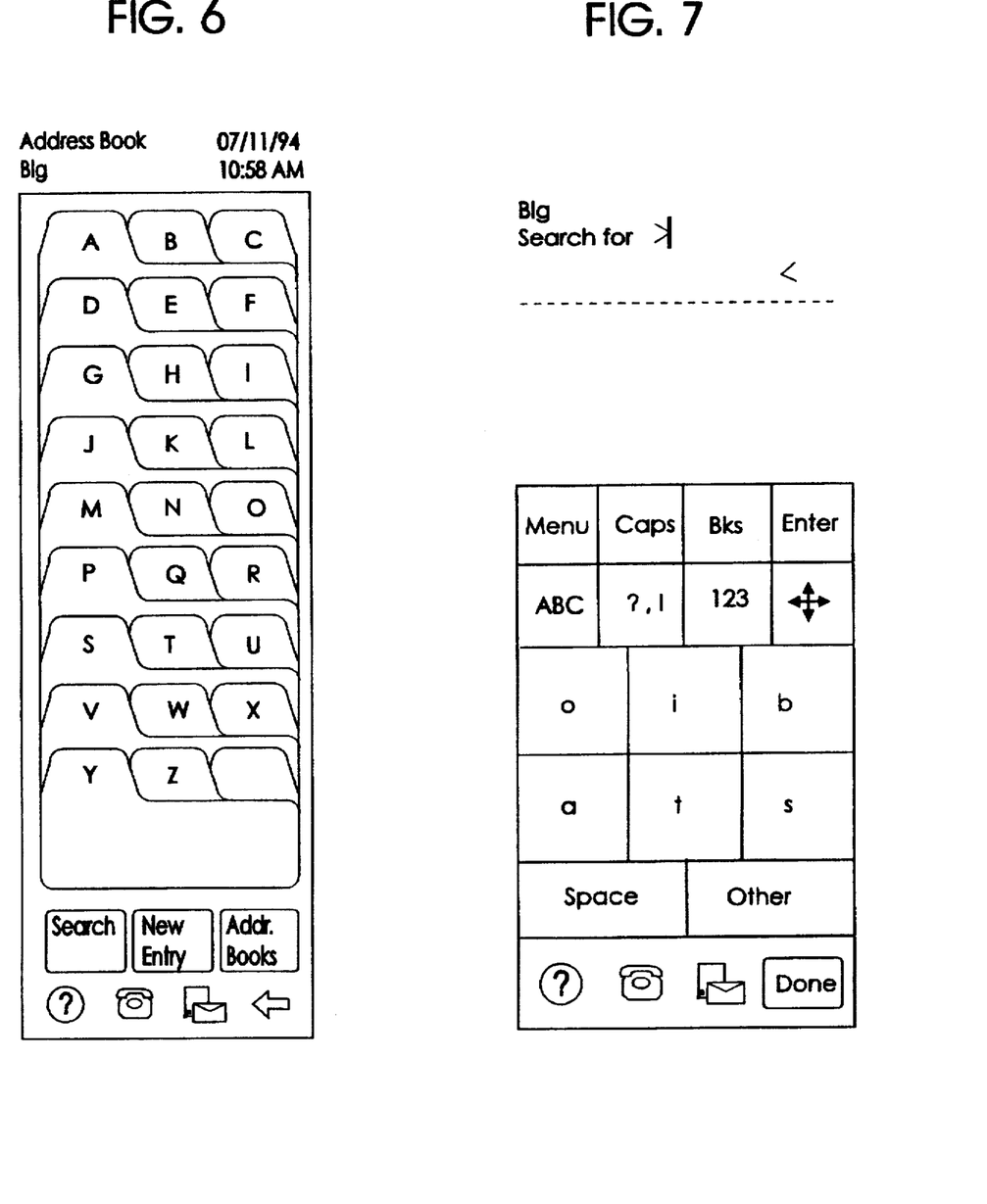
FIGS. 6 to 10 are respective screens illustrating an exemplar search of an entry in the address book of the instant invention device.

With reference to FIGS. 6 to 10, an overall view of the search function of the instant invention is given herein. Assuming that the "Address Book" icon shown in the mobile office screen of FIG. 4 has been pressed by the user, an address book screen such as that shown in FIG. 6 is displayed. As shown, the screen is divided into alphabetical file folders each containing entries of people whose last name begins with that particular letter. Thus, the user can press folder "A" in order to retrieve all of those persons whose last name begins with an "A". This is fine and good, except in instances where the user may have forgotten the name of the individual, or can remember only certain aspects of the individual which may not even be related to his name. For example, the user may only remember that the person who he wants to find is someone who lives in "Mainville", or someone who works for a company "ABC". Or, for that matter, the only thing the user remembers is that the person's first name is "John".

Given the incomplete recollection, with the present invention, the user only needs to press the search button of the FIG. 6 screen to retrieve the search screen such as that shown in FIG. 7. As shown, the FIG. 7 screen shows a predictor key format from which the user can enter a search string to search for the entry from the address book database that he desires. A discussion of how the keyboard shown in the lower half of the FIG. 7 screen can be operated for editing the search string is given in the aforenoted co-pending application identified. The user can input, as a search string, whatever he wants to search for and that could be a phone number, a name, or any other kind of information. The search string can in effect be an abbreviated name or things that he remembers with respect to the entry or entries that he wants to retrieve from the address book database, or any other databases of the device. When the input string is complete, the user presses the "Done" key at the bottom of the screen which brings on the screen shown in FIG. 8.

Figure 8:
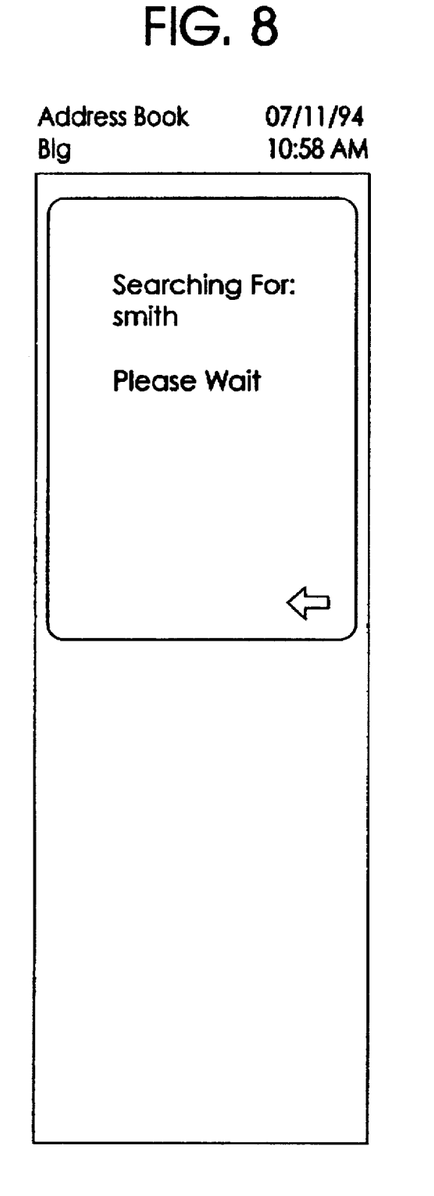

The screen shown in FIG. 8 is simply a "Please Wait" screen which, as its name implies, asks the user to wait while the searching algorithm searches for the entry (entries) that the user is seeking.

Figure 9:
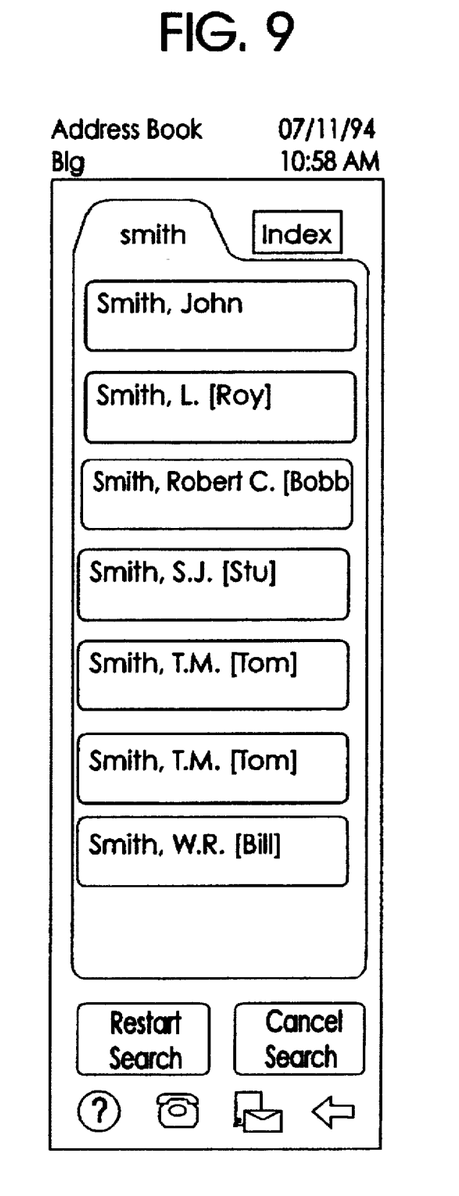

Upon completion of the search, the screen shown in FIG. 9 is displayed. Here, all entries that match the search string entered by the user in one way or the other are shown. In the example given, the search string, as shown in FIG. 8 was "Smith". Thus, all entries in the address book database which refer to "Smith" are shown on the screen of FIG. 9. Do note also that even though the exemplar screen of FIG. 9 only shows entries reflecting names of people, any entry that includes "Smith", such as for example a street name or anyone with "Smith" as part of his name, such as "Goldsmith" or variants thereof, would also have been retrieved. For that matter, suppose that the search string entered was only entered as "Smi" instead of "Smith", the invention function would nonetheless have retrieved the same entries as those shown in FIG. 9 (and also those with only "SMI"), provided that those are the only entries having the string "Smith". From the entry shown, the user can pick the particular "Smith" that he wants.

Figure 10:
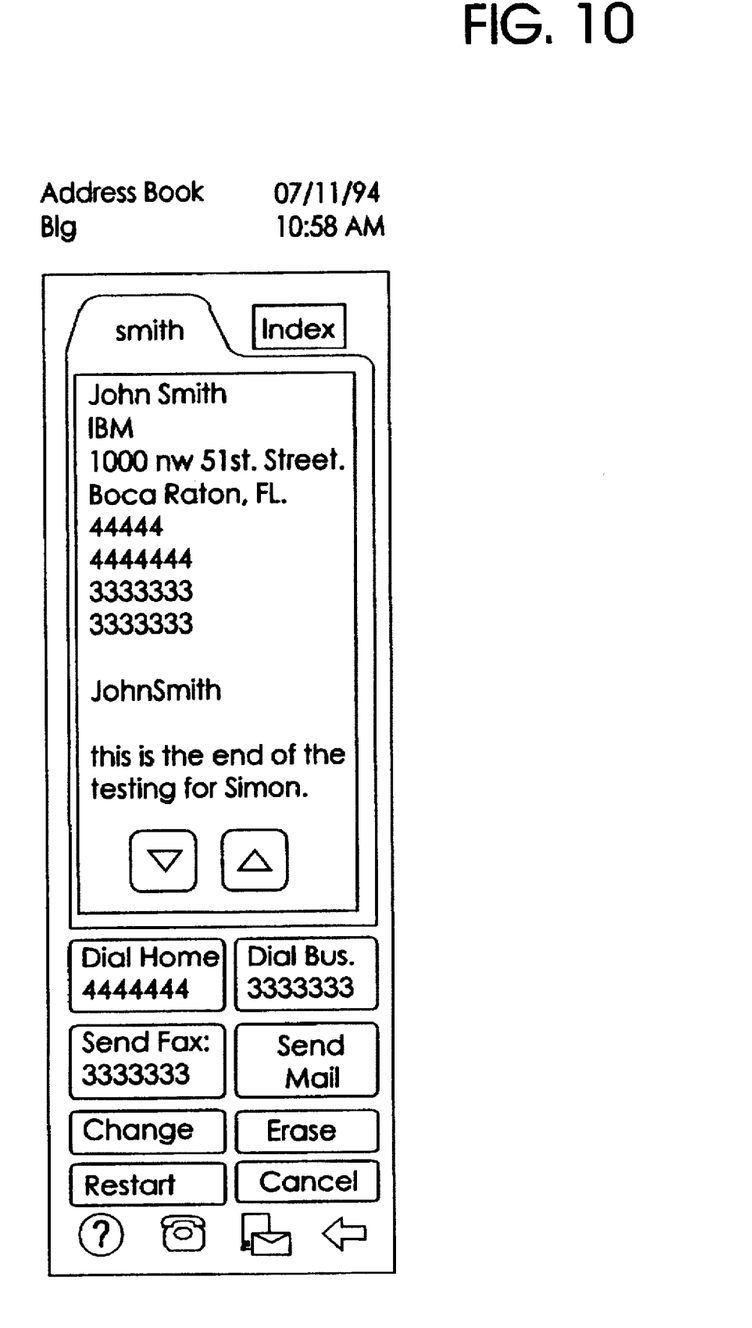

For the example given, the user picks the entry of "Smith, John". As shown in FIG. 10, the "John Smith" entry contains, aside from John Smith's name, his address, three different telephone numbers, and some notes in regard to the entry. As further shown at the lower portion of the screen of FIG. 10, the phone numbers are divided into a "Dial Home" phone number, a "Dial Business" phone number and a "Send Fax" phone number, as represented by the three different telephone numbers shown on the main screen.

With respect to the search operation of the instant invention, given the same example, assume that the data stored as one of the entries is "Mary and John Smith". Thus, by typing "Smith J", the search function of the instant invention would still pick up "Mary and John Smith". Likewise, if "Smith M" is input as the input search string, "Mary and John Smith" would also be retrieved. In fact, by inputting either "John Mary" or "S J", the entry of "Mary and John Smith" would be picked-up. So, too, would the entry of "Mary and John Smith" be retrieved if "M Smith" is input as a search string. Accordingly, it does not necessarily matter which order the parts of a name is input as the search string. Furthermore, the input of a comma or other delimiters also would have no effect on the searching function of the instant invention.

With respect to telephone numbers, the searching function of the instant invention also does not pay any attention to whether the search string of the telephone number input by the user is numbers or letters, or a combination of both. Thus, in the example given, by putting in "444", the searching function of the instant invention would pick-up the telephone number "444-4444". The same telephone number would be marked as a match even if the user were to put in "444-4444" or "444-GGGG". This is because the search function automatically strips away the "-" delimiter and also converts the letter "G" into "4".

Another example that further demonstrates the capability of the search function of the instant invention is the number "1-800-flowers", which is a well known phone number. To retrieve this telephone number, a user can type in "1-800". In which case all "800" phone numbers are retrieved from the database. Of course, the user then has to look through the list of "800" numbers in order to retrieve the entry with "1-800-flowers". Another way in which the "1-800-flowers" entry may be retrieved is if the user were to input as a search string the word "flowers". Thus, a user only has to provide a search string that is a portion of the being sought for name or telephone number of the entry.

A third type of search that the present invention search function performs is a comprehensive basic string search which reflects the search string input by the user. For this search, the search string is made case insensitive and the input search string is equated as a subset of the target, after all delimiters are removed. Delimiters for this invention are considered to be "(), - and space". The searching is done by a conventional STRSTR function which scans a string stored in the database for the occurrence of a given sub-string. Any string that does have the occurrence of the given sub-string is marked by a pointer and retrieved.

The operation of the search function of the instant invention is discussed hereinbelow with reference to the flow charts of FIGS. 11 to 15.

Figures 11, 11A:
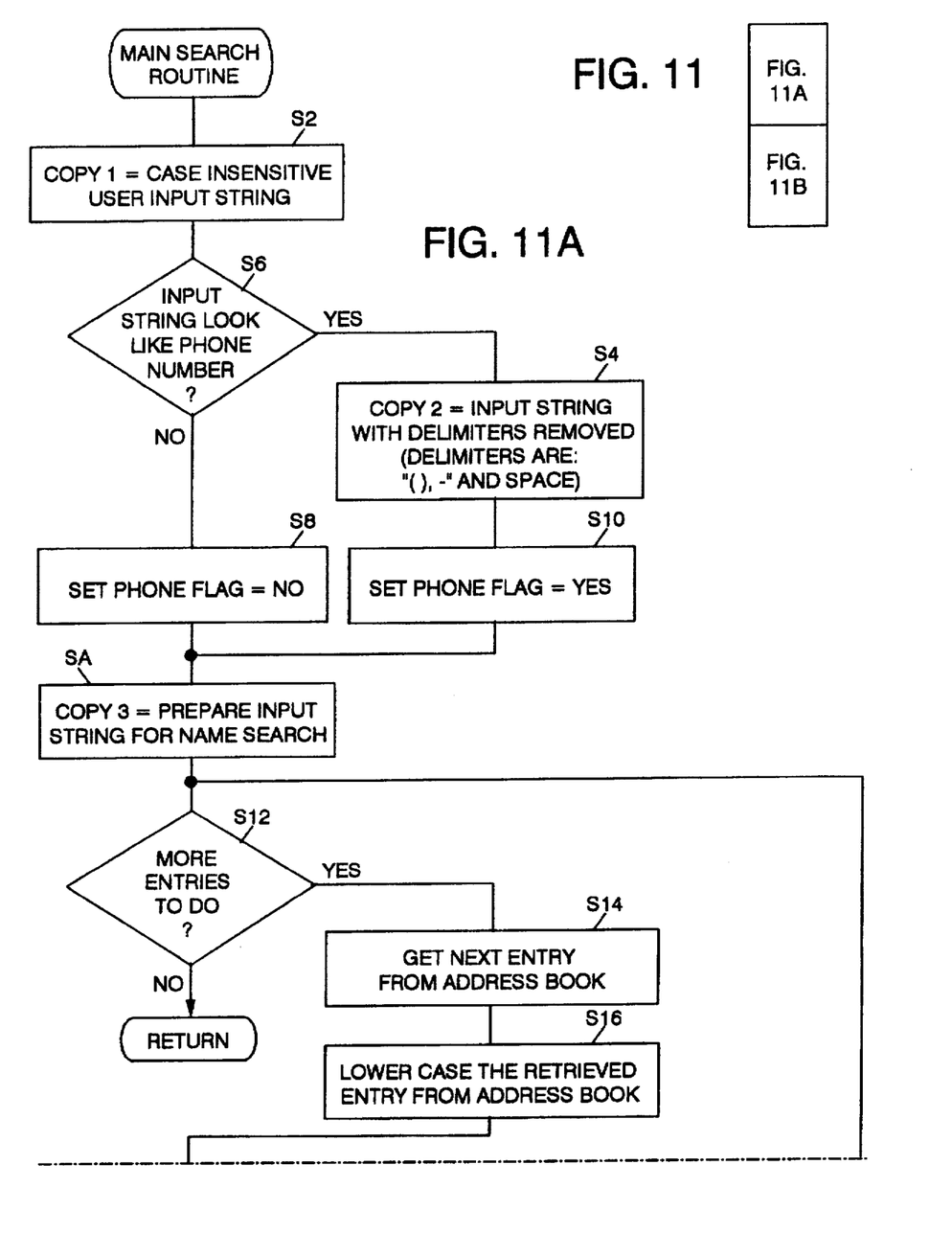
FIGS. 11A and 11B together form a flow chart illustrating the main routine of the inventive search method.
Figure 11B:
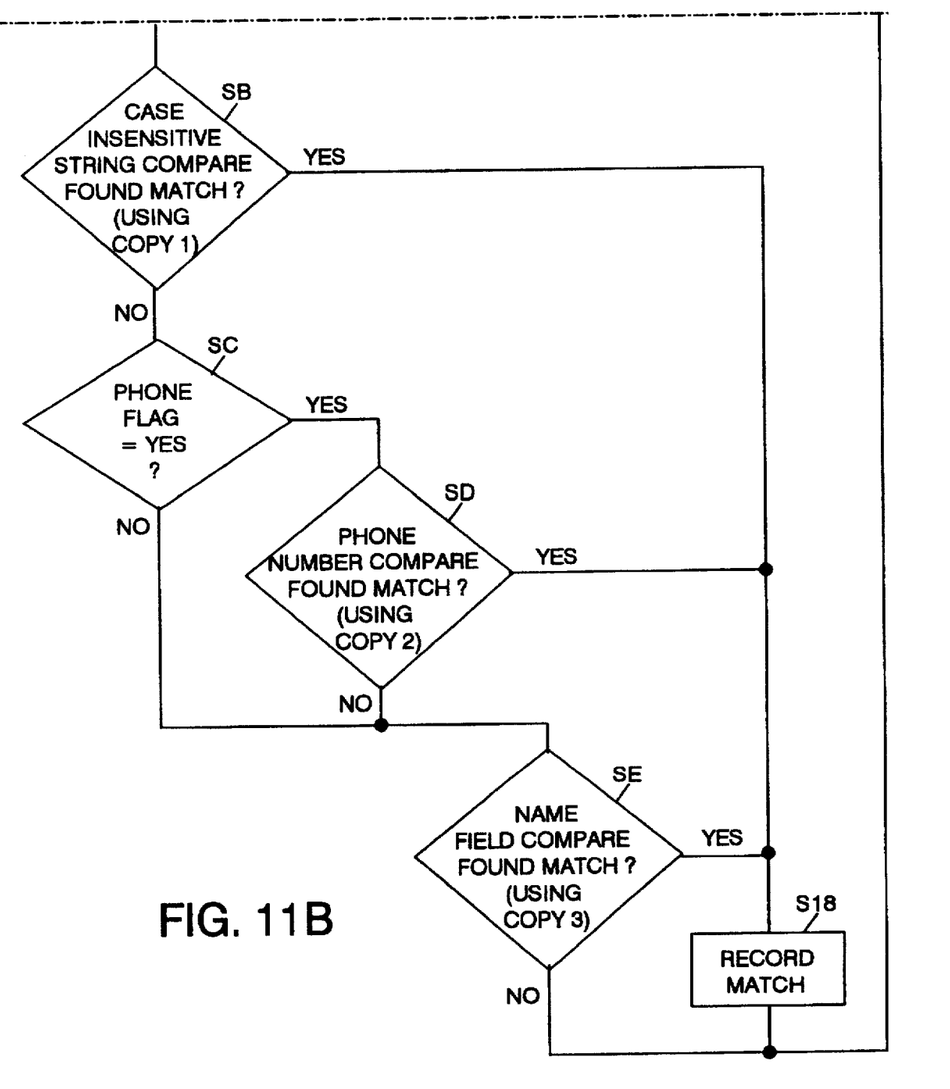

FIGS. 11A and 11B together form the flow chart illustrating the main search routine of the instant invention. The set-up of the program covers steps S2 to SA. Starting with block S2, a copy of the search string input by the user is converted into a case insensitive string. For the embodiment of the instant invention, the letters of the search string are converted to all lowercase. The system then goes to decision block S6 whereat a decision is made on whether the input string looks like a telephone number. This is achieved for the embodiment of the instant invention by means of a table whereby each character of the input string is scanned to determine whether the string contains any letters such as "Q" or "Z", which are characters outside the characters on the telephone key pad. Any string that includes those two letters would of course be determined not to be a telephone string. At which case the phone flag is set to no in block S8. On the other hand, if the input string is determined to a phone number, then the process proceeds to block S4 in which all delimiters of the input string are removed. After which the phone flag is set to yes per block S10. Irrespective of whether the phone flag is set to yes or no, the process proceeds to block SA in which the input string is prepared for a name field search.

As was mentioned previously, the contents of the database, for the embodiment being discussed being an address book, are divided into at least the name search field, the telephone search field and the miscellaneous search field. Of course, it should be noted that in addition to the three main search fields, other search fields such as an address and a comment search field may also be used. In any event, the preparation of the input string for performing a name search is illustrated in the flow chart of the sub-routine shown in FIG. 12.

Figure 12:
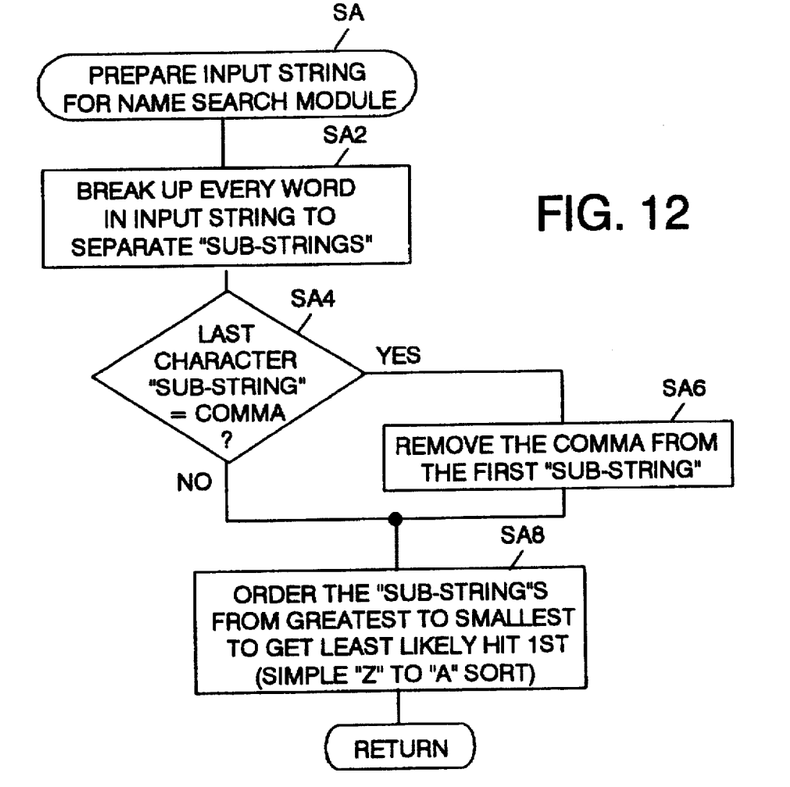
FIG. 12 is a flow chart of a sub-routine executed during the course of execution of the main search routine of FIG. 11.

For the exemplar sub-routine, three sub-search fields are arbitrarily chosen. These sub-fields are taken to be the first, middle and last name fields. Thus, in block SA2, each word of the input string is broken down into separate "sub-strings" corresponding to the different sub-fields. For example, if a user keys in "John and Mary Smith", "John" is determined to be one string, "and" is determined to be a second string, "Mary" is determined to be yet a third string and "Smith" is determined as being the last string. In essence, the input string is broken down into smaller elements so that each word of the name string is determined by itself.

After the different words of the input string have been divided into sub-strings, the method proceeds to block SA4 to determine if the last character of any of the sub-strings has a ",". If it does, then chances are that the "sub-string" is the last name since most people would put a "," after the last name if the last name was indeed entered first, as for example "Smith, John". If indeed a "," is detected as being the last character of a sub-string, then the "," is removed from the first "sub-string" in block SA6.

The method then orders the sub-strings from the greatest to the smallest as to get the least likely matched word to be first, per block SA8. In essence, this is simply a "Z" to "A" sort which is a backwards sort that puts the words of names that have the least incidence of occurrence first. For example, there are more words starting with the letter "M" than there are words that start with "Ma". Putting it differently, suppose there is the entry of "Mary Mean" in the address book. Thus, if "M" is to be looked for first, both "Mary" and "Mean" would be retrieved. However, if "Ma" is searched first, only "Mary" is retrieved. Thus, by comparing the input string with the least like hit first, the "Ma" will get hit less likely than "M". Of course, if the last character of the sub-string is determined not to be "," per block SA4, the method would go directly to block SA8. Thereafter, the process returns to the main search routine at block S12.

At block S12, a determination is made on whether there are any additional entries in the database. If not, the programs returns to the beginning of the search routine. If there is, the method proceeds to block S14 to get the next entry from the database, in this instance the address book. At block S16, the retrieved entry from the address book is changed to a lower case string so as to make it case insensitive. The process next proceeds to decision block SB where the case insensitive string is compared with the input string.

Figure 13:
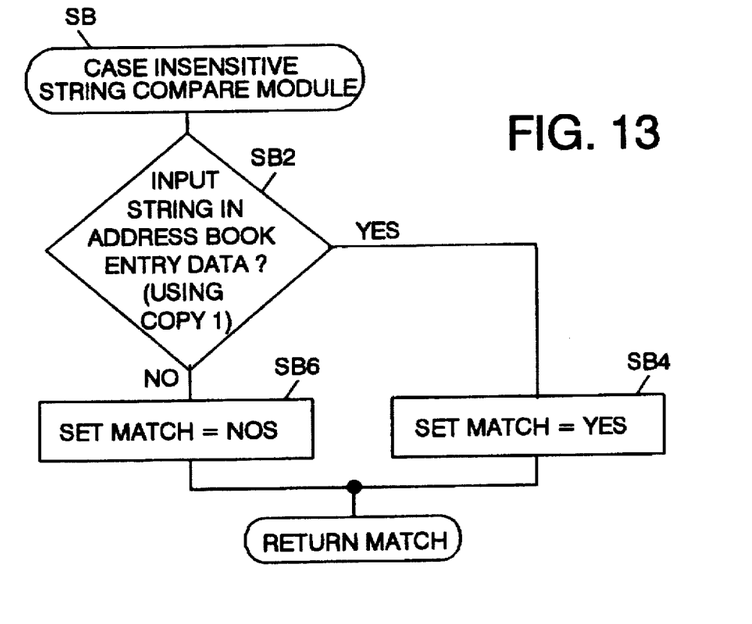
FIG. 13 is a flow chart of another sub-routine of the FIG. 11 search program.

This is illustrated in greater detail in sub-routine or sub-module SB in which a determination is made on whether or not the input string is a subset of the entry of address book. If it is not, the set match flag is set to no per bock SB6. If it is, the set match flag is set to yes in block SB4. Basically, the compare sub-routine SB flags every occurrence of the input string in the entries stored in the database. For example, if a user had entered as an input the word "Mainville", any entries that have "Mainville" anywhere in it would be retrieved. It could be in the name field or any of the other search fields.

After sub-routine SB, the process continues to decision block SC where a determination is made on whether the phone flag has been set. If it has, it means that the input string did look like it could be a phone number and the process continues to decision block SD. If it is not, the phone number comparison process would be bypassed and the process continues to decision block SE.

Figure 14:
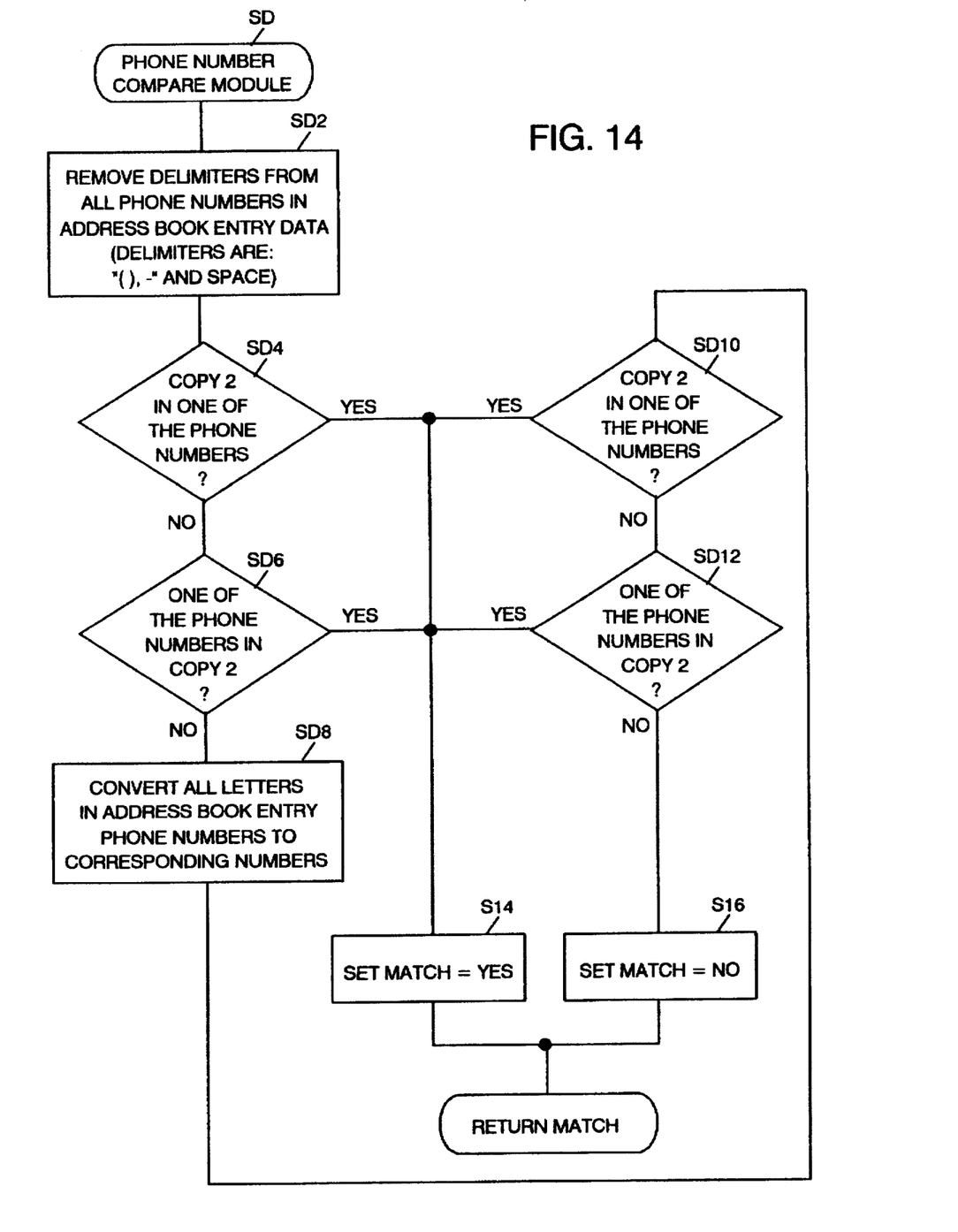
FIG. 14 is a flow chart illustrating the phone number comparison sub-routine during the execution of the main search program of FIG. 11.

Refer to the phone number comparison sub-routine SD. As shown, starting with block SD2, the delimiters for more phone numbers in the address book entry are stripped of all of the delimiters. Delimiters in the instant invention relate to "(), - and space". This is done for all of the phone numbers and all of the entries in the address book. Next, in block SD4, a determination is made on whether the input search string is a subset of any of the phone numbers. If it is not, a determination is made on whether any of the phone numbers, for example the three telephone numbers in the example entry of FIG. 10, is a subset of the input string. If not, proceeding to block SD8, all letters of the phone numbers of each entry of the address book database are converted into numbers. For example, the previous discussed "1-800-flowers" is now converted to "18003569377".

Thereafter, the process continues to block SB10 in which a comparison is again made with the input string to determine if the input string is now a subset of the phone numbers. If it is not, a determination is again made per block SD12 on whether any of phone numbers of each of the entries is a subset of the input string. If again no match is made, the match flag is set to no in block SD16. On the other hand, if a match is made on any of the decision blocks SD4, SD6, SD10 and SD12, the set match flag is set to yes in block SD14. Thereafter, sub-routine SD is terminated and the process returns to the main search routine at block SE. It should be noted that the set match flag of block SD14 is the same as the "record match" block S18.

In the main search routine, the program now proceeds to block SE in which the input string is compared with the name search field of the database. This is further elaborated in the name field compare sub-routine SE shown in FIGS. 15A and 15B. To start, every word in the first, middle and last name sub-fields from each of the address book entries is separated into sub-strings SE2. For example, refer again to the previously given example of the "John and Mary Smith" entry. "Smith" would be placed in the last name field and "John and Mary" would be placed in the first name field. "Smith" becomes one sub-string, "John" a second sub-string, "and" a third sub-string, and "Mary" the last sub-string. Since no sorting is required, the first sub-string of the input string is designated by pointer "i" in block SE3.

Figures 15, 15A:
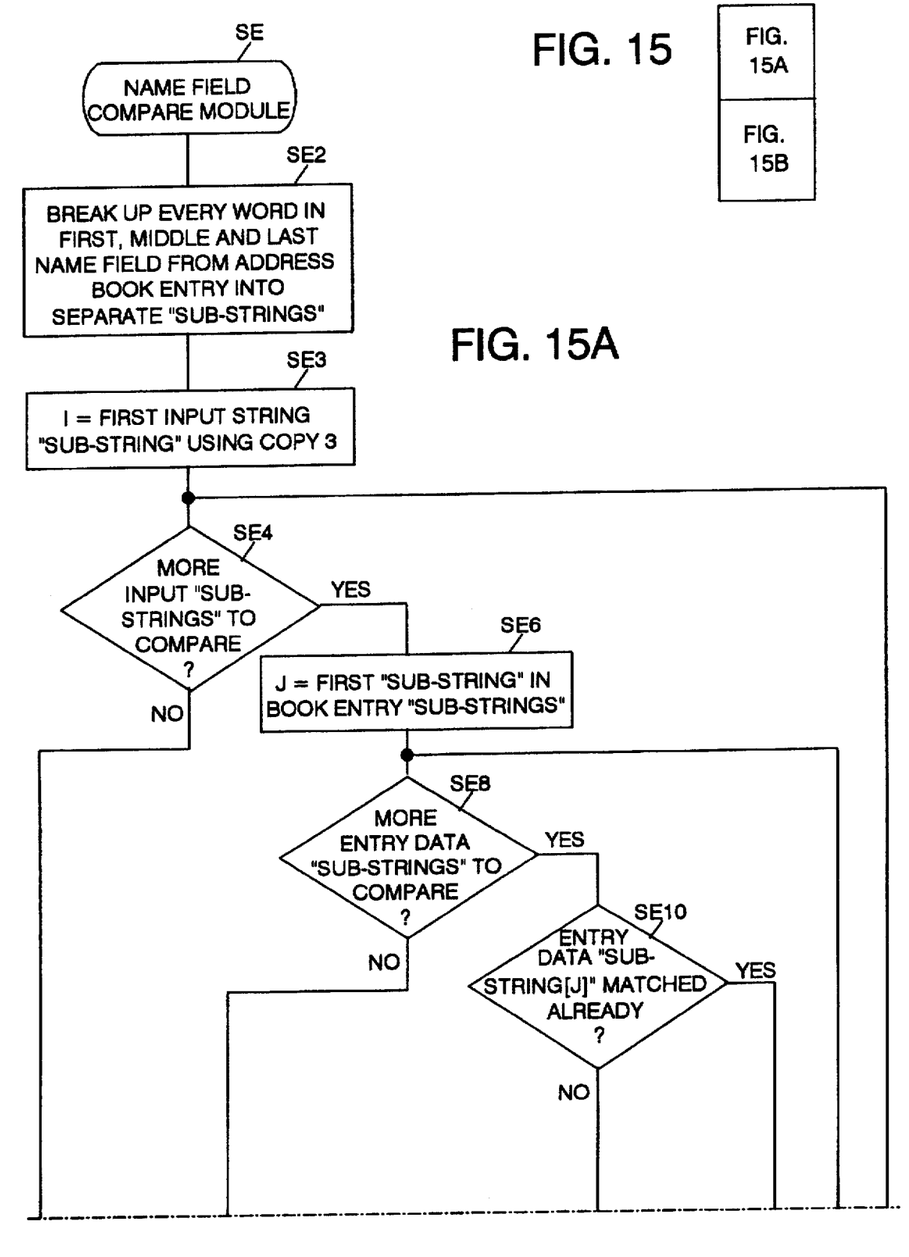
FIGS. 15A and 15B together provide a flow chart illustrating the name comparison sub-routine of the main search program of FIG. 11.
Figure 15B:
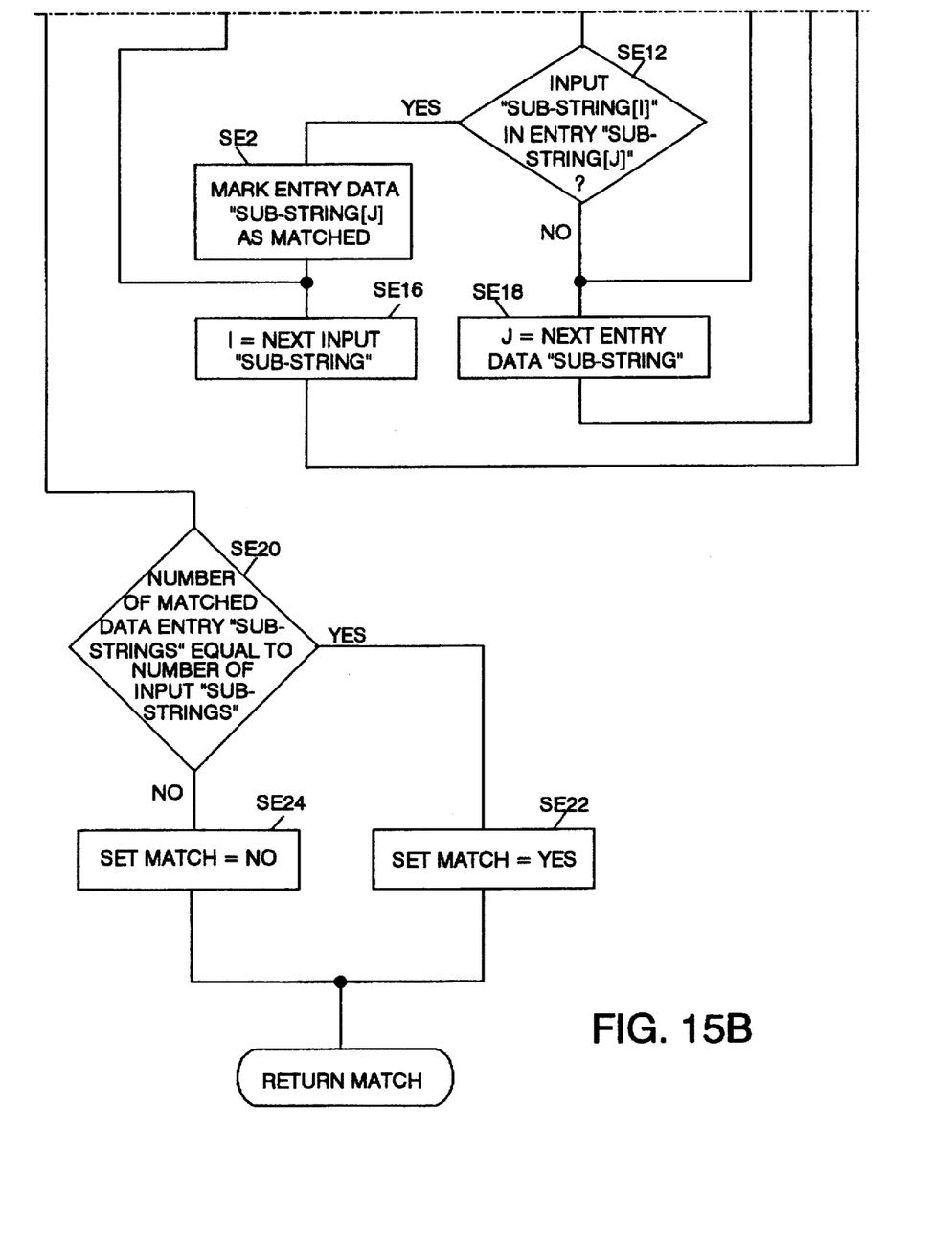

Next, whether or not there are more input "sub-strings" that require comparison with the strings of the named search field of the address book is determined in decision block SE4. Obviously, for the first time, the answer is yes since there has to be at least one comparison. Thus, the first sub-string in the address book entry sub-strings is designated by a pointer "j" per block SE6. Whether or not there are more entry data sub-strings to be compared is determined in block SE8. Since for the first time, the answer is yes, the program proceeds to block SE10 in which a determination is made on whether the entry data sub-string "j" is matched. If the answer is no, a determination is made on whether the input sub-string "i" is a subset of the entry sub-string "j" in block SE12. If it is, the entry data is marked in block SE14 as being matched. This is done so as not to compare the same entry again the next time a match is required in another search field. In other words, that entry is to be by-passed in the next compare. If it is a match, the pointer would point to the next input sub-string, i.e., "i" equals the next input sub-string. If the answer from the determination of block SE12 is no, the input sub-string is determined not to be a subset of the entry sub-string, and the process is returned to point to the next entry data sub-string for further comparison. In other words, the process returns to block SE8 and the determinations for block SE8, SE10 and SE12 are repeated. The next entry data being marked as a sub-string is pointed to by pointer "j" in block SE18.

If it is determined that there is a match from block SE12, the sub-string for the entry is marked as having been matched in block SE14. Thereafter, pointer "i" points to the next sub-string of the input string per block SE16. The process is then returned to block SE4 to determine if there are additional sub-strings of different entries in the database that are to be compared with the sub-strings of the input string.

If there are no more entries, the program proceeds to decision block SE20 to determine if the number of matched data entry sub-strings equal to the number of input strings. In other words, if the input string is "John Smith", and if "Smith" has made a hit and "John" has also made a hit, the answer to be determined in block SE20 would be yes. At which time the set match flag is set to yes in block SE22. On other hand, if there is a hit for "Smith" and none for "John", the match is set to no in block SE24. In essence, the number of matches has to be equalled to the number of input sub-strings. If it is, it is a match. Otherwise it is a no. Thereafter, sub-routine SE terminates and the process is returned to the main search routine.

As should be apparent to those skilled in the art, many changes can be made in the details and arrangement of steps and parts discussed herein without departing from scope of the invention as defined in the appended claims.

What is claimed is:

1. A method within a data processing system for searching an address database having a plurality of entries, said plurality of entries each arranged as one or more predetermined search fields, wherein each of said predetermined search fields contains a character string, said method comprising:

(a) in response to receipt of a search string, determining whether said search string is a subset of a search field within a particular entry among said plurality of entries;

(b) in response to a determination that said search string is a subset of said particular entry, recording said particular entry as a matching entry;

(c) in response to a determination that said search string is not a subset of said particular entry, determining if a modified search string formed by removing delimiters from said search string is a subset of a character string within a particular predetermined search field within said particular entry;

(d) in response to a determination that said modified search string is a subset of said character string within said particular predetermined search field, recording said particular entry as a matching entry; and (e) repeating steps (a), (b), (c), and (d) for each of said plurality of entries within said database, wherein entries among said plurality of entries which include a character string which matches said search string are efficiently located.

2. The method for searching a database of claim 1, and further comprising converting said search string into a case-insensitive search string.

3. The method for searching a database of claim 1, and further comprising:

displaying the matching entries.

4. The method for searching a database of claim 3; and further comprising the steps of:

arranging words in said search string as one or more sub-search string;

arranging words in a character string within a particular predetermined search field within said particular entry as one or more sub-character strings;

determining whether each of said sub-search strings is a subset of a distinct one of said one or more sub-character strings; and in response to a determination that each of said sub-search strings is a subset of a distinct one of said one or more sub-search strings, recording said particular entry as a matching entry.

5. The method for searching a database of claim 4, wherein said particular predetermined search field within said particular search string is a name search field which stores a name, and wherein said steps of arranging said search string and arranging said character string comprise arranging said search string such that each word within said search string is a sub-search string and arranging said name such that each word within said name is a sub-character string.

6. The method for searching a database of claim 4, wherein within said step of determining whether each of said sub-search strings is a subset of a distinct one of said one or more sub-character strings, said sub-search strings are processed in order of length from longest to shortest.

7. The method for searching a database of claim 4 wherein one search field is for telephone numbers and for matching any alphabetic characters in a subsearch string or a subcharacter string are converted to the corresponding number on a telephone keypad.

8. A data processing system comprising:

memory means for storing an address database having a plurality of entries, said plurality of entries each arranged as one or more predetermined search fields, wherein each of said predetermined search fields contains a character string;

means for receiving an input specifying a search string of characters;

means for searching said database to locate entries among said plurality of entries which match said search string, including:

means for determining whether said search string is a subset of an entry among said plurality of entries;

means for recording said entry among said plurality of entries as a matching entry in response to a determination that said search string is a subset of said entry;

means for determining if a modified search string formed by removing delimiters from said search string is a subset of a character string within a particular predetermined search field within said entry in response to a determination that said search string is not a subset of said entry; and means for recording said particular entry as a matching entry in response to a determination that said modified search string is a subset of said character string within said particular predetermined search field, wherein entries among said plurality of entries which match said search string are efficiently located.

9. The data processing system of claim 8, and further comprising means for converting said search string into a case-insensitive search string.

10. The data processing system of claim 8, said means for searching further comprising:

means for determining whether said modified search string is a superset of said character string within said particular predetermined search field within said entry;

means for recording said entry as a matching entry in response to a determination that said modified search string is a superset of said character string within said particular predetermined search field.

11. The data processing system of claim 10, said means for searching further comprising:

means for arranging words of said search string as one or more sub-search strings;

means for arranging words of a character string within a particular predetermined search field within each of said plurality of entries as one or more sub-character strings;

means for determining whether each of said sub-search strings within said particular predetermined search field of said entry is a subset of a distinct one of said one or more sub-character strings; and means for recording said entry as a matching entry in response to a determination that each of said sub-search strings is a subset of a distinct one of said one or more sub-search strings.

12. The data processing system of claim 11, wherein said particular predetermined search field within said particular search string is a name search field which stores a name, and wherein said means for arranging said search string and means for arranging said character string comprise means for arranging said search string such that each word within said search string is a sub-search string and means for arranging said name such that each word within said name is a sub-character string.

13. The data processing system of claim 11, wherein said means for determining whether each of said sub-search strings is a subset of a distinct one of said one or more sub-character strings processes said sub-search strings in order of length from longest to shortest.

14. The data processing system of claim 8, and further comprising a display for displaying all matching entries to a user.

15. The data processing system of claim 14, wherein said database comprises an address book, and wherein said one or more predetermined search fields include a name search field, an address search field, and a telephone number search field.

16. The data processing system of claim 15, said data processing system comprising a personal communication device, wherein said display comprises a touch sensitive display upon which at least a name and a telephone number are displayed for each matching entry, said personal communication device further comprising:

communications interface means for effecting a call to a telephone number displayed within said touch sensitive display.

17. A computer program product for searching a database having a plurality of entries, said plurality of entries each arranged as one or more predetermined search fields, wherein each of said predetermined search fields contains a character string, said computer program product stored on a computer-readable media for use within a data processing system, said computer program product comprising:

instruction means stored within said computer-readable media for causing said data processing system to search said database to locate entries among said plurality of entries which match a search string, including:

instruction means stored within said computer-readable media for accepting as input said search string;

instruction means stored within said computer-readable media for causing said data processing system to determine whether said search string is a subset of an entry among said plurality of entries;

instruction means stored within said computer-readable media for causing said data processing system to record said entry among said plurality of entries as a matching entry in response to a determination that said search string is a subset of said entry;

instruction means stored within said computer-readable media for causing said data processing system to determine if a modified search string formed by removing delimiters from said search string is a subset of a character string within a particular predetermined search field within said entry in response to a determination that said search string is not a subset of said entry; and instruction means stored within said computer-readable media for causing said data processing system to record said particular entry as a matching entry in response to a determination that said modified search string is a subset of said character string within said particular predetermined search field, wherein an entry among said plurality of entries which match said search string is efficiently located.

18. The computer program product of claim 17, and further comprising instruction means stored within said computer-readable media for causing said data processing system to convert said search string into a case-insensitive search string.

19. The computer program product of claim 17, said instruction means for searching further comprising:

instruction means stored within said computer-readable media for causing said data processing system to determine whether said modified search string is a superset of said character string within said particular predetermined search field within said entry;

instruction means stored within said computer-readable media for causing said data processing system to record said entry as a matching entry in response to a determination that said modified search string is a superset of said character string within said particular predetermined search field.

20. The computer program product of claim 19, said instruction means for searching further comprising:

instruction means stored within said computer-readable media for causing said data processing system to arrange said search string as one or more sub-search strings;

instruction means stored within said computer-readable media for causing said data processing system to arrange a character string within a particular predetermined search field within each of said plurality of entries as one or more sub-character strings;

instruction means stored within said computer-readable media for causing said data processing system to determine whether each of said sub-search strings within said particular predetermined search field of said entry is a subset of a distinct one of said one or more sub-character strings; and instruction means stored within said computer-readable media for causing said data processing system to record said entry as a matching entry in response to a determination that each of said sub-search strings is a subset of a distinct one of said one or more sub-search strings.

21. The computer program product of claim 20, wherein said particular predetermined search field within said particular search string is a name search field which stores a name, and wherein said instruction means for arranging said search string and instruction means for arranging said character string comprise instruction means stored within said computer-readable media for causing said data processing system to arrange said search string such that each word within said search string is a sub-search string and instruction means for arranging said name such that each word within said name is a sub-character string.

22. The computer program product of claim 20, wherein said instruction means for determining whether each of said sub-search strings is a subset of a distinct one of said one or more sub-character strings causes said sub-search strings to be processed in order of length from longest to shortest.

* * * * *